United States Patent [19]
Franke et al.

[11] Patent Number: 6,093,435
[45] Date of Patent: Jul. 25, 2000

[54] PROCESS FOR REMOVING FAT SUBSTITUTES FROM FOODS CONTAINING SAME

[75] Inventors: Henry L. Franke; Henry E. Naylor; Neelam Misal, all of Baton Rouge, La.

[73] Assignee: University Research & Marketing, Baton Rouge, La.

[21] Appl. No.: 08/552,381

[22] Filed: Nov. 3, 1995

Related U.S. Application Data

[63] Continuation-in-part of application No. 07/256,258, filed as application No. PCT/US92/11394, Dec. 31, 1992, Pat. No. 5,525,746.
[51] Int. Cl.⁷ ....................................................... A23C 4/03
[52] U.S. Cl. .......................... 426/474; 426/417; 426/429; 426/438; 426/442
[58] Field of Search ..................................... 426/474, 601, 426/417, 429, 438, 442

[56] References Cited

U.S. PATENT DOCUMENTS 4,334,061  6/1982  Bossier, III .

OTHER PUBLICATIONS

WPIDS Database Abstract. AN:83–808560(645) for DE 3215315 (Inventor: Bayer et al) issued Nov. 1983.

*Primary Examiner*—Anthony J. Weier
*Attorney, Agent, or Firm*—Henry E. Naylor

[57] ABSTRACT

A process for removing fat substitutes from food products containing same, particularly fried food products, such as potato chips. The method involves treating a fat substitute-containing food product with an effective solvent at effective temperatures and pressures, then separating the fat substitute-laden solvent from the food product now having reduced fat substitute content.

12 Claims, No Drawings

PROCESS FOR REMOVING FAT SUBSTITUTES FROM FOODS CONTAINING SAME

CROSS REFERENCE TO RELATED APPLICATIONS

This is a continuation-in-part of U.S. Ser. No. 08/256,258 filed on Jun. 30, 1994, now U.S. Pat. No. 5,525,746 which is the national stage filing of PCT/US92/11394 filed on Dec. 31, 1992.

FIELD OF THE INVENTION

The present invention relates to a process for removing fat substitutes from food products containing same, particularly fried food products, such as potato chips. The method involves treating a fat substitute-containing food product with an effective solvent at effective temperatures and pressures, then separating the fat substitute-laden solvent from the food product now having reduced fat substitute content.

BACKGROUND OF THE INVENTION

About 40% of the daily calorie intake of the average American diet is provided by fats (e.g. triglycerides) which are hydrolyzed and which are subsequently absorbed during digestion. While fats are necessary for balanced nutrition, the average consumer consumes more than is needed for proper nutrition. Furthermore, the sharp increase in consumption of fast foods in the American diet is thought to be a major contributor to the increase in the amount of dietary fat because fast foods, which typically rely on frying, contain relatively large amounts of fats. The high level of fats in the diet is thought to contribute to serious health problems, such as heart disease, arteriosclerosis, and obesity. A reduction in the caloric intake can be significantly enhanced by a reduction in the intake of dietary fat, since fats have about twice the caloric density of proteins and carbohydrates. Consequently, there is a great commercial demand for low fat, low calorie food products, especially snack foods such as potato chips, but with the palate appeal of the original fat-containing product. Unfortunately, all too often, low fat and no-fat means an inferior tasting food product when compared to the original full fat product.

One approach to making low fat and no-fat food products, particular snack food products is to do so without frying. For example, U.S. Pat. No. 4,756,916 teaches a process for producing low-fat potato chips by first washing potato slices with an aqueous solution, then applying oil to the washed slices to coat the slices with oil. The oil coated slices are then blanched, essentially pre-frying the slices due to the oil coating, then baked at a temperature of at least about 390° F. to partially dry the slices. The partially dried potato slices are then baked at a temperature of about 290° F. (140° C.) to 320° F. (160° C.) to finish drying the slices. Other non-frying techniques are taught U.S. Pat. Nos. 4,906,483; 4,873,093; 4,919,965; 5,298,707; and 5,370,898. All of the resulting products from these processes do not have the palate appeal of the equivalent fried version.

Another approach is taught in co-pending U.S. patent application Ser. No. 08/256,258, filed Dec. 31, 1992 wherein fat is removed from prepared foods by use of a normally gaseous solvent, preferably butane, propane, and mixtures thereof. Such a process is capable of producing fried snack foods, particularly potato chips, which are substantially fat free and which have the palate appeal of conventional snack foods fried in vegetable oil.

Other approaches to producing foods low in fats and calories is to use a fat substitute in place of at least a portion of conventional triglyceride fat. Much research and development is taking place to produce fat substitutes. For example, Protor and Gamble have a line of fat subsitutes referred to Olestra, which they are trying to get approved by the FDA. Nabisco is marketing a fat substitute call Salatrim, which is reported to have 5 calories per gram and consists of three fatty acids attached to a glycerol, but includes primarily long-chain stearic acid, which the body absorbs poorly, and either acetic, propionic, or butyric short-chain acids, which have fewer calories than other fatty acids. Pfizer is developing a fat subsitute they refer to as Veri-Lo which is a fat extender based on oil-in-water and fat-in-water emulsions of common substances such as soybean oil and milk fat. Pfizer is also working on a product called Litesse, which is an improved version of the polydextrose which Pfizer has been selling for some time. Nutrasweet is marketing a product called Simplesse which has only 1 to 2 calories per gram; National Starch has N-Lites, which is manufactured from starch; and A.E. Staley Manufacturing Co. has Stellar which is an acid hydrolyzed starch.

One major strategy for developing low calorie replacement fats has been to structurally re-engineer natural triglycerides in such a way as to retain their conventional functional properties in foods, while removing their susceptibility toward hydrolysis and subsequent absorption into the body during digestion. To this end, the fatty acids attached to glycerol have been replaced with alternative acids (U.S. Pat. No. 3,579,548); groups have been inserted between the fatty acids and the glycerol backbone ("propoxylated glycerols", European Patent No. 254,547); the ester linkages have been replaced by ether linkages (U.S. Pat. No. 3,818, 089); the ester linkages have been reversed (U.S. Pat. No. 4,508,746); and the glycerol moiety has been replaced with an alternate alcohol (e.g., ethylene glycol in U.S. Pat. Nos. 2,924,528 and 2,993,063).

A second major strategy for the development of a low calorie fat substitutes has been to synthesize non-absorbable polymeric materials which are structurally unlike triglycerides, but which have physical properties, such as mouthfeel, similar to edible fats. Mineral oil was disclosed as a fat substitute as early as 1894 (U.S. Pat. No. 519,980), and more recently, polydextrose (U.S. Pat. No. 4,631,196), polyglucose and polymaltose (U.S. Pat. No. 3,876,794), polysiloxane (European Patent No. 205,273), jojoba wax (W. German Patent No. 3,529,564), and polyethylene polymers (E. German Patent No. 207,070) have also been suggested.

A third major strategy combines the first two. Rather than restructure triglyceride molecules or find a substitute which is structurally very dissimilar to triglyceride molecules, this third approach involves the use of various polyolester compounds, as non-absorbable fat substitutes, which have numbers of fatty acid groups in excess of the three found in conventional fat triglycerides. The polyester compositions are typically nondigestible mixtures of sucrose hexa-, hepta-, and octa- fatty acid esters. Also, fully esterified sugars were suggested as fat substitutes during World War I (notably mannitol, Lapworth, A., and Pearson, L. K., and Halliburton, W. D., et al., 13 J Biol. Chem. 296 and 301 (1919)), and the Southern and Western Regional Research Laboratories of the U.S.D.A. investigated the feasibility of using amylose esters as new-type fats during the 1960's (see Booth, A. N., and Gros, A. T., 40 J. Amer. Oil Chem. Soc. 551 (1963). More recently, sucrose polyesters have been suggested (U.S. Pat. No. 3,600,186). The caloric availability and digestibility of a series of dimeric and polymeric glycerides including diglyceride esters of succinic, fmaric, and adipic acids, and polymeric fats from stearic, oleic and short-chain dibasic acids were assessed by the U.S.D.A. group cited supra, and polyglycerol esters have since been suggested (U.S. Pat. No. 3,637,774).

While a multitude of fat substitutes has been proposed, there are serious questions as to health risks that may arise if significant amounts of such compositions find their way into the diet. For example, non-digestible fats, at moderate to high levels, have serious problems because they: (i) act as a laxative and are passed through the body causing anal leakage; (ii) absorb valuable minerals and vitamins from the body; and (iii) elicit foreign body reactions like those early documented for mineral oil. Therefore, there is a need to reduce the level of fat substitutes to safer levels in foods containing same.

SUMMARY OF THE INVENTION

In accordance with the present invention, there is provided a process for removing a fat substitute from fat substitute-containing food products, which process comprises: (a) treating the fat substitute-containing food product with an effective solvent; and (b) separating fat substitute-laden solvent from the resulting food product of reduced fat substitute content.

In preferred embodiments of the present invention, the solvent is a normally gaseous solvent selected from the group consisting of carbon dioxide, methane, ethane, propane, butane, isobutane, ethylene, propylene, butylene, sulfur dioxide, nitrogen, dimethylether, methylene chloride, and nitrous oxide.

In other preferred embodiments of the present invention, the process for removing the fat substitute is conducted at supercritical conditions in the presence of a normally gaseous solvent, particularly a solvent selected from carbon dioxide, butane, propane, and hexane.

In other preferred embodiments of the present invention, the fat substitute contains a polyol fatty acid polyester wherein In still other embodiments of the present invention, the fat substitute is selected from the group consisting of: carboxy/carboxylated disubstituted esters; trishydroxymethyl alkane esters; primary amide esters and ester derivatives; esterified polyoxyalkylene block copolymers; synthetic polyalpha olefin cooking and flying oils; and substituted succinate acid esters.

Also in accordance with the present invention, there is provided a process for reducing the amount of fat substitute from a food which is cooked or fried in said fat substitute, which process comprises:

(a) introducing the fat substitute containing food product into an extraction zone;

(b) introducing a normally gaseous solvent into said extraction zone;

(c) maintaining said solvent in contact with said food product at effective temperatures and pressures and for an effective amount of time to remove a predetermined amount of fat substitute;

(d) collecting the resulting fat substitute-laden solvent; and (e) collecting the food product which now has substantially less fat substitute.

In preferred embodiments of the present invention, the food product is an animal-derived food product selected from the group consisting of dairy products, fried chicken, fried chopped meat, and a fried fish product.

In other preferred embodiments of the present invention, the food product is an agricultural-based food product selected from fried snack food, more preferably potato chips and corn chips.

In other preferred embodiments of the present invention, a process is provided comprising:

(a) introducing a food product which had been fried in a fat substitute into an extraction zone;

(b) introducing a normally gaseous solvent into said extraction zone;

(c) providing effective pressures and temperatures that will cause the normally gaseous solvent to become a liquid;

(d) maintaining the solvent, in liquid form in contact with the fried food product for a period of time to extract a predetermined amount of fat substitute from said fried food product;

(e) passing the fat substitute-laden solvent mixture from the extraction zone to a separation zone;

(f) separating the solvent from the fat substitute in the separation zone and passing the separated solvent to a storage zone from where it is recycled to the extraction zone; and (g) collecting the fat substitute and a fried food product having substantially less oil than the food product before extraction.

In still another preferred embodiment of the present invention, the extraction zone is evacuated and flushed with an inert gas prior to introduction of the fat substitute containing food product.

In yet other preferred embodiments of the present invention, an inert gas is used to displace the solvent in the extraction zone as it is passed from the extraction zone to the separation zone.

In other preferred embodiments of the present invention the solvent is passed from the extraction zone to the separation zone under conditions which will maintain the solvent in the liquid phase.

In another preferred embodiment of the present invention, the extraction zone is subjected to conditions which will repeatedly stress and relax the fat substitute and/or solvent molecules.

In still other preferred embodiments of the present invention, the fat substitute-extracted food product is subjected to microwaves in other to aid in the removal of residual amounts of solvent from the resulting product which is now substantially free of fat substitute.

DETAILED DESCRIPTION OF THE INVENTION

Any fat substitute can be removed from the prepared food by practice of the present invention as long as it is at least partially soluble in the solvent for its removal. Preferred are fat substitutes which are suitable for use at cooking and frying temperatures, preferably temperatures of about 350° F. to about 400° F. (175° to 200° C.). The term "fat substitute", as used herein means any edible material which is substantially non-digestible, which has the mouth feel of dietary fat, and which can be used in a food preparation process where fat or oil (i.e., triglyceride fat) is normally employed, in total or partial replacement. By "nondigestible" is meant that only about 70% or less, preferably only about 20% or less, and more preferably only about 1% or less of such materials can be digested by the human body.

Alternatively, "nondigestible" can also mean that only about 70% or less, preferably only about 20% or less, more preferably only about 1% or less, of a material can be hydrolyzed, versus a triglyceride, by the enzymes in the lipase test described in U.S. Pat. No. 5,422,131 to Proctor and Gamble, which is incorporated herein by reference.

An important class of heat stable fat substitutes, suitable for flying, are the polyol fatty acid polyesters described in U.S. Pat. Nos. 5,077,073; 5,194,281; 5,306,514; 5,306,515; 5,306,516; 5,314,707; and 5,422,13; all to Proctor and Gamble Company and all of which are incorporated herein by reference. The fat substitutes suitable for frying are preferred because they can be used to impart the fried flavor to the food product, than removed by the practice of the present invention. In this way the fried flavor is preserved, but potentially harmful amounts of fat substitute are removed.

The most preferred fat substitutes that are extracted by the process of this invention are the polyol fatty acid polyesters. By "polyol" is meant a polyhydric alcohol containing at least 4, preferably from 4 to 12, more preferably from about 4 to 8, and most preferably from 6 to 8, hydroxyl groups. Polyols thus include sugars (i.e., monosaccharides, disaccharides and trisaccharides), sugar alcohol (i.e., the reduction product of sugars wherein the aldehyde or ketone group has been reduced to an alcohol), other sugar derivatives (e.g., alkyl glycosides), polyglycerols, such as diglycerol and triglycerol, pentaerythritol, and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose. Preferred polyols include erythritol, xylitol, sorbitol, and glucose, with sucrose being an especially preferred polyol.

By "polyol polyester" is meant a polyol, as described above, having at least 4 ester groups, i.e., at least 4 of the hydroxyl groups of the polyol are esterified with fatty or other organic acids. Polyol esters that contain 3 or less ester groups are generally digested in (and the products of digestion are absorbed from) the intestinal tract much in the manner of ordinary triglyceride fats or oils, whereas those polyol esters which contain 4 or more ester groups are generally substantially nondigestible and consequently non-absorbable by the human body. Typically, substantially all (e.g., at least about 85%) of the hydroxyl groups of the polyol are esterified. For liquid polyol polyesters, preferably at least about 95% of the hydroxyl groups of the polyol are esterified. In the case of sucrose polyesters, typically from about 7 to 8 of the hydroxyl groups of the polyol are esterified.

By "ester group" is meant a moiety formed from the reaction of a hydroxyl group with an organic acid or acid derivative which moiety contains fatty acid and/or other organic radicals having at least 2 carbon atoms, typically at least 8 carbon atoms, more typically at least 12 carbon atoms, most typically at least 16 carbon atoms. Representative examples of such fatty and other organic acid radicals include: acetic, propionic, butyric, caprylic, captic, lauric, myristic, myristoleic, palmitic, palmitoleic, stearic oleic, elaidic, ricinoleic (hydroxyl group unesterified or esterified with fatty or other organic acids), linoleic, linolenic, eleostearic, arachidic, arachidonic, behenic, lignoceric, erucic, and cerotic fatty acid radicals and other organic acid radicals including aromatic ester-forming radicals such as benzoic or toluic; branched chain radicals such as isobutyric, neooctanoic or methyl stearic; ultra-long chain saturated or unsaturated fatty acid radicals such as tricosanoic or tricosenoic; cyclic aliphatics such as cyclohexane carboxylic and polymeric ester-forming radicals such as polyacrylic and dimer fatty acid. These fatty or other organic acid radicals can be derived from naturally occurring or synthetic acids. The acid radicals can be saturated or unsaturated, including positional or geometrical isomers, e.g., cis- or trans-isomers, straight chain or branched chain aliphatic or aromatic, and can be the same for all ester groups, or can be mixtures of different acid radicals.

Liquid nondigestible fat substitutes are those having a complete melting point below about 100° F., and typically contain ester groups having a high proposition of $C_{12}$ or lower fatty acid radicals, or a high proposition of $C_{18}$ or higher unsaturated fatty acid radicals. The term "complete melting point", as used herein refers to the temperature at which all of the solid components have melted. Preferred polyol fatty acid liquid compositions are those wherein: (i) the polyol has at least about 4 hydroxyl groups, (ii) the ester groups are comprised of (a) fatty acid radicals selected from the group consisting of $C_{12}$ or higher unsaturated fatty acid radicals, $C_2$–$C_{12}$ saturated fatty acid radicals or mixtures thereof, and (b) $C_{20}$ or higher saturated fatty acid radicals at a molar ratio of (a):(b) being from about 1:15 to about 2:1, and (iii) at least about 4 of the hydroxyl groups of the polyol are esterified. A pourable composition can be prepared from the above by the addition of: (a) a liquid non-digestible oil having a melting point of less than about 100° F.; (b) 0–90 wt. % digestible oil having less than about 5 wt. % solids at 70° F.; and (c) 0–10 wt. % hardstock; wherein the ratio of the polyol fatty acid polyester to additives (a), (b), and (c) is from about 1:99 to 9:91.

Suitable liquid nondigestible edible fat substitutes suitable for use herein, other than those described above, include liquid polyol polyesters (see U.S. Pat. No. 4,005,195; liquid esters of tricarballylic acids (see U.S. Pat. No. 4,508,746); liquid diesters of dicarboxylic acids such as derivatives of malonic and succinic acid (see U.S. Pat. No. 4,582,927); liquid triglycerides of alpha-branched chain carboxylic acids (see U.S. Pat. No. 3,579,548); liquid ethers and ether esters containing the neopentyl moiety (see U.S. Pat. No. 2,962,419); liquid fatty polyesters of polyglycerol (see U.S. Pat. No. 3,932,532); liquid alkyl glycoside fatty acid polyesters (see U.S. Pat. No. 4,840,815); liquid polyesters of two ether linked hydroxypolycarboxylic acids (see U.S. Pat. No. 4,888,195); liquid esters of epoxide-extended polyols (see U.S. Pat. No. 4,861,613); and liquid polydimethyl siloxanes (e.g., Fluid Silicones available from Dow Corning). All of the above patents are incorporated herein by reference. The term "edible", as used herein, is used in the broad sense and includes anything edible, whether or not intended for nutrition.

Preferred liquid nondigestible fats are the liquid polyol polyesters that comprise liquid sugar polyesters, liquid sugar alcohol polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 8 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e., fatty acids derived from low erucic acid rapeseed oil), sunflower seed oil fatty acids, sesame seed oil fatty acids, safflower oil fatty acids, fractionated palm oil fatty acids, palm kernel oil fatty acids, coconut oil fatty acids, tallow fatty acids, and lard fatty acids.

The following are non-limiting examples of specific liquid polyol polyesters suitable for use in the present invention: sucrose tetraoleate, sucrose pentaoleate, sucrose hexaoleate, sucrose heptaoleate, sucrose oxtaoleate, sucrose hepta- and octaesters of unsaturated soybean oil fatty acids, canola oil fatty acids, cottonseed oil fatty acids, corn oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol polyesters suitable for use in the present invention can be prepared by a variety of methods known to those skilled in the art. These methods include: transesterification of polyol (i.e., sugar or sugar alcohol) with methyl, ethyl or glycerol esters containing the desired acid radicals using a variety of catalysts; acylation of the polyol with an acid chloride; acylation of the polyol with the desired acid, per se. (See for example, U.S. Pat. Nos. 2,831,854; 3,600, 186; 3,963,699; 4,517,360; 4,518,722; all of which are incorporated herein by reference.

The nondigestible liquid fat substitutes will typically contain an effective amount of solid nondigestible oil loss control particles. That is, an amount that will be effective to control passive leakage from the body. These are preferably relatively small nondigestible solid particles of certain polyol polyester material that are dispersed in the liquid nondigestible oil to control or to prevent passive oil loss. The shape of the particle can be any shape, but preferred are spherulitic and platelet-like shapes, more preferred are platelet-like shapes. The size of the particles will typically be in the 1 micron or less range. Thinner particles are preferred from the standpoint of providing more efficient passive oil loss control of the liquid nondigestible oil component. These nondigestible particles will typically be dispersed as discrete, unaggregated entities in the liquid nondigestible oil. It is particularly preferred that these nondigestible particles have a complete melting point above about 100° F., but below about 130° F. dispersed in the liquid nondigestible component in an amount sufficient to control passive oil loss upon the ingestion of said composition; said nondigestible particles not consisting solely of polyol polyesters wherein the polyol moiety of said polyol polyesters has at least 4 hydroxyl groups, at least 4 of which hydroxyl groups are esterified, and wherein the ester groups in said polyol polyesters are comprised of a combination of:

(i) $C_{12}$ or higher unsaturated fatty acid radicals, $C_2$–$C_{12}$ saturated fatty acid radicals or mixtures thereof, and (ii) $C_{20}$ or higher saturated fatty acid radicals, wherein the molar ratio of (I) to (ii) radicals in said combination ranges from about 1:15 to about 2:1 and wherein at least 15% by weight of the fatty acid radicals forming said combination are $C_{20}$ and higher saturated fatty acid radicals; and wherein the liquid nondigestible oil and the nondigestible solid particles are co-crystallized in a manner such that the nondigestible solid forms dispersed platelet-like particles having thickness of about 1 micron or less in the liquid nondigestible oil.

The term "platelet like" refers to a substantially flat, essentially two-dimensional type of particle having a length and width in the unfolded planar configuration that is substantially greater in dimension than its thickness.

The solid polyol polyesters used in the present invention can be made according to prior known methods for preparing polyesters of polyols. Since the sucrose polyesters are the preferred solid polyol polyesters herein, the invention will be exemplified primarily by these materials. One such method of preparation is by reacting the acid chlorides of the fatty acids with sucrose. In this method a mixture of the acid chloride or acid anhydride of the fatty acids can be reacted in one step with sucrose, or the acid chlorides can be reacted sequentially with sucrose. Another preparation method is by the process of reacting methyl esters of the fatty acids with sucrose in the presence of a fatty acid soap and a basic catalyst such as potassium carbonate. See, for example, U.S. Pat. No. 3,963,699, Rizzi et al., issued Jun. 15, 1976; U.S. Pat. No. 4,518,772, Volpenhein, issued May 21, 1985; and U.S. Pat. No. 4,517,360, Volpenhein, issued May 14, 1985, and U.S. Ser. No. 417,990, Letton, filed Oct. 6, 1989, all incorporated herein by reference. The solid polyol polyesters used in the present invention has complete melting points above 100° F., preferably above about 130° F., and most preferably above about 140° F.

It may not be necessary to use the solid nondigestible component with the liquid nondigestible component when preparing foods that will be extracted in accordance with the present invention, depending how much fat substitute will be left in the extracted food product. For example, substantially all of the fat substitute will be removed, thus mitigating any problems, such as passive oil loss, owing to ingestion of the small amount, if any, fat substitute remaining.

Other examples of fat substitutes include the carboxy/carboxylated disubstituted ester edible fat mimetics described in U.S. Pat. No. 5,124,166 to Nabisco, which are represented by the formula:

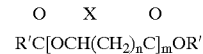

where m=1 to 20; n=0 to 12; X=H, or an alkyl group having 1 to 16 carbon atoms, and R' is an aliphatic group having 1 to 30 carbon atoms, the various R' groups being the same or different.

Such fat substitutes comprise compounds having a backbone bearing a pendant hydroxyl group alkylated with a fatty acid, forming a carboxy substituent ($O_2C$ R', where R' is an aliphatic group having 1 to 30 carbons), and a pendant carboxylic acid group esterified with a fatty alcohol, forming a carboxylate substituent ($CO_2R'$, with R' as defined above).

Other non-limiting examples of suitable fat substitutes are the amide linked fat mimetics disclosed in U.S. Pat. No. 5,139,807; trishydroxymethyl alkane esters disclosed in U.S. Pat. No. 5,169,665; the primary amide esters and ester derivatives of U.S. Pat. No. 5,190,783; the crosslinked protein fat substitute compositions of U.S. Pat. No. 5,374, 441; the esterified polyoxyalkylene block copolymers of U.S. Pat. No. 5,308,634; the synthetic polyalpha olefin cooking and flying oils of U.S. Pat. No. 5,320,857; and the substituted succinate acid esters of U.S. Pat. No. 5,176,933.

Any food product that contains a fat substitute and which can withstand solvent extraction can be used in the practice of the present invention. For example, ice cream of which at least a portion of its fat content is replaced with a fat substitute is not a suitable food product for the solvent extraction process of this invention. The preferred food products are those which are cooked and fried in a fat substitute, more preferably agricultural food products, and most preferably potato chips, French fries, and corn chips. The cooking or frying medium can be either a fat substitute alone, or a fat substitute with a conventional cooking oil. For example, the frying or cooking medium can contain from about 10 wt. % to 100 wt. % of fat substitute, with the balance, if any, being a conventional triglyceride fat. Preferred agricultural food products suitable for use in the present invention are those which can typically be reshaped directly from the raw state. Such foods include bananas, plantains, potatoes, yams, turnips, and sweet potatoes, and the like. Other foods, such as rice and corn, can also be manipulated to form slices and can also be used in the process of the present invention. For example, corn food products can be pop corn, which is cooked in a hot fat substitute, or can be prepared initially by forming a dough from water and corn flour. The dough can then be extruded, and cut into the desired shape for frying. There are many variations on this basic procedure for manipulating flour or dough into a shape suitable for frying. For example, see U.S. Pat. Nos. 3,600,193 (mixing corn flour with seasonings); U.S. Patent No. 3,922,370 (mixing water, rice, and rice flour); and U.S. Pat. No. 3,348,950 ) mixing corn, sucrose, water, and corn grits), all of which are incorporated herein by reference. Generally, the process of the present invention can be used with all foods that are cooked, preferably fried, in a fat substitute. The term "fried" as used herein means to cook in hot oil, fat, or fat substitute. Furthermore, the terms "cooked" and "fried" can be used interchangeably in this application. It is to be understood that the terms "oil" and "fat" are also often used interchangeably herein. Further, the term "fat-free", as defined by the United States Food and Drug Administration means a food product containing less than about 0.5 wt. % fat, based on the total weight of the food product. Consequently, for purposes of the present invention, any food product which contains less than about 0.5 wt. % fat substitute will be considered fat substitute free. The process of the present invention will work substantially equally for both liquid fat substitute and solid fat substitutes. In other words, the present invention will be used on any cooked or fried agricultural food product that contains a fat substitute. The term "animal-derived", as used herein, refers to any food product which is derived from the animal kingdom, including foods, such as beef and pork, including pork rinds; fish, poultry, preferably chicken; and dairy products, such as cheese.

Any suitable cooking technique using oil and/or fat can be used for preparing the preferred food products of the present invention. Typically the food product, if an animal-derived food product, will be a so-called "fast food" such as hamburgers (chopped meat), fried chicken, and fried fish products. If the food product is an agricultural food product, it will preferably be a potato or corn based product, more preferably potato chips and corn chips. The thrust of the present invention is not with the actual cooking, or flying, of the food product, but with removing the fat substitute as well as any conventional oil or fat after cooking, without substantially altering the taste of the product. By the practice of the preferred mode of the present invention, the food product is first cooked or fried in a medium containing the fat substitute by any conventional means to ensure superior flavor—then the fat substitute is solvent extracted.

Effective solvents are those in which the fat substitute is at least partially soluble at a temperature of at least about 75° C. Preferred are non-toxic (eatable) solvents. Preferably the fat substitute will be miscible or soluble to at least a 0.25 to 1, more preferably at least about 0.5 to 1; and most preferably at least about 0.75 to 1; based on the ratio of fat substitute to solvent. The most preferred solvents are those which are normally gaseous at typical atmospheric conditions. That is, those which are a gas at about room temperature (about 70° F.) and atmospheric pressure. Non-limiting examples of suitable normally gaseous solvents include methane, ethane, propane, butane, isobutane, ethylene, propylene, butylene, sulfur dioxide, nitrogen, carbon dioxide, ammonia, dichlorodifluor methane, dimethylether, $CHF_3$, $CClF_3$, $CFBr_3$, $CF_2=CH_2$, $CF_3-CF_2-CF_3$, $CF_4$, $CH_3-CF_3$, $CHCl_2$, methyl fluoride, and nitrogen oxide normally gaseous as indicated. Preferred are methane, propane, butane, butylene, and carbon dioxide, more preferred is carbon dioxide, butane, and propane; and most preferred is propane. Carbon dioxide is the most preferred solvent for supercritical extractions. The weight ratio of solvent to agricultural food product will be from about 1:1 to 2:1, preferably from about 1.2:1 to 1.5:1. A co-solvent, such as a $C_2$ to $C_6$ alcohol, preferably ethanol, may be used. If a co-solvent is used it may be used in place of at least about 5 to 90 vol. %, preferably about 5 to 50 vol. %, and more preferably from about 5 to 25 vol. %, of the primary solvent. It is also understood that normally, liquid solvents, such as the $C_2$ to $C_6$ aliphatic alcohols, preferably methanol and ethanol, and more preferably ethanol, can be used. If a normally liquid solvent is used for the extraction of the fat substitute material, then a separation process, such as distillation, will be required to separate the fat substitute from the resulting fat substitute-laden solvent after extraction.

The fat substitute compositions can be removed form the food product in accordance with the present invention under either subcritical, critical, or supercritical conditions. It is preferred to conduct the present invention at subcritical conditions. At supercritical conditions, the solvent, which will typically be a normally gaseous solvent, is subjected to temperatures and pressures over limits known as Critical Pressure (Pc), and Critical Temperature (Tc). Above these limits, the resulting supercritical fluid will have different properties than they possess in the gaseous state. That is, at Critical Temperature, the gas can no longer be converted to a liquid by increasing the pressure. At supercritical conditions the gas will be in a dense phase and will exhibit properties of a liquid and will have increased solvation properties. The preferred solvent for supercritical extraction of the fat substitutes are carbon dioxide, butane, and propane; more preferably carbon dioxide, and propane; and most preferably carbon dioxide. Each normally gaseous solvent will of course have its own set of critical conditions.

In it's simplest form, the present invention is practiced at subcritical conditions by contacting the fat substitute-containing food product with an effective solvent, followed by separating the resulting fat substitute-laden solvent from the resulting food product, which now contains a reduced amount of fat substitute. Preferred is that the extracted food product have less than about 50%, more preferably less than about 25%, and most preferably less than about 10% of the original fat substitute content. It is also within the scope of the present invention to remove substantially all of the fat substitute from the food product—that is, less than about 0.5 wt. %.

In a more detailed procedure, the instant invention can be practiced by introducing a fat substitute-containing food product into an extraction zone. The extraction zone can be comprised of one or more vessels suitable for the volumes, temperatures, and pressures employed herein. It may be preferred to use more than one extraction zone so that one extraction zone can be in the extraction stage while another extraction zone, which had previously undergone extraction, can be unloaded of extracted food product, then reloaded with another charge of food product to start another extraction cycle. Non limiting types of vessels which may be used for the extraction zone include fixed-bed, slurry-bed, moving-bed vessels, as well as vessels in which the animal-derived food product is fed therethrough on a belt, or with a screw. It is preferred that the vessel be one in which a fixed-bed of food product can be loaded. The food product is preferably fed into the extraction zone so as to form a fixed-bed of food product. Typically the fixed-bed of food product will rest on a porous structure, such as a metallic screen. Although not critical, it is preferred that the extraction zone be evacuated prior to introduction of solvent, especially if the solvent is normally gaseous solvent like propane, which could possibly form an explosive mixture with air. The evacuation can be conducted in any suitable manner, such as, by use of a vacuum pump or by merely venting the air into the atmosphere as it is displaced by the solvent which is being introduced into the extraction zone. Of course, any combustible solvent which contaminates the vented air can be burned-off during venting. It is also within the scope of the present invention that the extraction zone be flushed with an inert gas, preferably nitrogen, prior to introduction of the solvent. It is preferred that the inert gas be heated, for example at a temperature from about 40° to 200° F., preferably from about 80° F. to 150° F. This heated inert act as evacuating the extraction zone of air as well as heating, or drying the food product. It is preferred that the food product be dry before being contacted with the solvent to mitigate, or prevent, freezing which may occur during the process, particularly during step wherein a normally gaseous solvent is being vaporized. While the heated inert gas can be used to dry the food product, it may also be dried by any other appropriate means, such as by heating it by conventional means, including the use of ovens or microwaves. Furthermore, after flushing the extraction zone with inert gas, the inert gas can be used to pressurize the extraction zone so that when the normally gaseous solvent is introduced into the extraction zone it is immediately transformed to the liquid state.

The normally gaseous solvent is typically fed into the extraction zone in the vapor state. Although the extraction can be performed with the solvent in a gaseous state, a suitable pressure and temperature can be applied to cause the normally gaseous solvent to liquefy. It is also within the scope of this invention that the normally gaseous solvent be introduced into the extraction zone already in a liquid state. It is also within the scope of the present invention that the solvent be introduced into the extraction zone in the form of a mist or spray. The conditions of extraction are preferably sub-critical conditions. That is, the solvent during extraction will be in a form which can be considered a true vapor state or a true liquid state. At critical conditions, the temperature and pressure are such that the liquid and gaseous phases of a pure stable substance become identical. Typically, the temperature will be from about ambient temperature (22° F.), up to about 140° F., preferably from about 70° F. to 130° F., although higher temperature used. Of course, these temperatures may vary for any given animal-derived food product and solvent combination, and the precise conditions are within the skill of those having ordinary skill in the art given the teaching herein. The pressure maintained in the extraction zone will be a pressure which is effective for maintaining the solvent as a gas or a liquid, preferably a liquid. While this pressure will be dependent on such things as the particular solvent and temperature employed, it will typically range from less than atmospheric pressures to about 200 psig, preferably from about 15 psig to 200 psig, more preferably from about 100 psig to 140 psig, when a solvent such as propane is used.

The extraction zone can also be subjected to conditions which will repeatedly stress and relax the oil and/or solvent molecules. Such stressing and relaxation can be caused by fluctuating the pressure of the extraction zone by at least about ¼ psig, preferably by at least about ½ psig, more preferably by at least 1 psig, and most preferably by at least 5 psig. This pressure fluctuation can be caused by actuating and deactuating a piston or diaphragm in the pressure or solvent line. The stressing and relaxation conditions can also be caused by sonication. That is, by subjecting the ingredients of the extraction zone to sonic energy.

The extraction can also be accomplished in more than one extraction. That is, the food product can undergo several extractions with fresh solvent in order to assure more complete removal of fat substitute. For example, a first extraction may leave as much as 3 to 10 vol. % of the oil in the material. A substantial amount of this residual fat substitute can then be removed by subjecting the fried food product to at least one more extraction with fresh solvent, preferably heated fresh solvent. Of course, the economics of the process must be considered so that the cost of additional extractions does not exceed the value of the added products from the additional extractions.

The food product will preferably sit on a filtering means, such as a screen, or membrane filter, or perforated tray, through which the solvent passes with the extracted fat substitute. It is understood that an alternative process feature is one wherein the filtering means is situated between the extraction zone and the separation zone. The solvent is maintained in contact with the food product for an effective period of time. That is, for a period of time which will result in the extraction of a predetermined amount of fat substitute. The most desirable extractions are when the resulting food product is fried in the fat substitute and substantially all of the fat substitute is removed.

The solvent/fat substitute mixture is passed from the extraction zone to a separation zone. If the solvent in the extraction zone is in the liquid phase, then it is preferred that the solvent be passed to the separation zone under conditions which will maintain the solvent as a liquid. It is important that the pressure be maintained in the extraction zone during removal of the solvent and fat substitute so as to prevent unnecessary evaporation of solvent resulting in freezing of the extracted material. A preferred method of maintaining the pressure in the extraction zone during removal of solvent and fat substitute is to introduce a flush gas, preferably an inert gas such as nitrogen, into the extraction zone to replace the leaving solvent/fat substitute mixture. By "inert gas" is meant a gas which will not have a deleterious effect on the food product or extracted fat substitute which can be recycled for cooking a fresh batch of food product. The flush gas will also preferably be one which is dissimilar to the solvent used herein. For example, it will be a gas, which at a given temperature will liquefy at a higher pressure than the solvent. In other words, it is preferred that the inert gas be a gas and not a liquid at extraction conditions. The flush gas replaces the solvent/fat substitute mixture in the extraction zone and maintains substantially the same pressure throughout the solvent/fat substitute removal step. It is preferred that the flush gas be heated. That is, that it be at a temperature that will cause the extracted food product to be from about 90° F. to 140° F., preferably from about 100° F. to 120° F. This heated flush gas can enhance the recovery of any residual fat substitute and solvent left in the extracted food product. It is also within the scope of this invention that solvent vapor be passed through the extracted food product either in place of the flush gas or following the passage of flush gas. This solvent vapor will act to remove at least a portion of the residual fat substitute left in the extracted food product. Any remaining solvent can be removed from the final product by use of a partial pressure. It is also within the scope of the present invention to use microwaves to remove residual amounts of solvent from the extracted food product.

The separation zone is run under conditions which will enhance the separation of solvent from the fat substitute. It is preferred that heat be applied to enhance this separation. Other conditions for operating the separation zone to enhance solvent/oil separation include distillation, centrifugation, and reduced pressures. The separated solvent is then passed to a storage zone where it can be recycled to the extraction zone. Makeup solvent, if needed, can be added. At least a portion of the recovered solvent can be recycled directly to the extraction zone.

Various ingredients can be added to the fried food product either during or after extraction. Non-limiting examples of ingredients that can be added include vitamins and flavorings, including salt. Any suitable method can be used to add the ingredients to the animal-derived fried food product. For example, after extraction, flavoring can be added to the reduced fat food product by spaying the extracted food product with a light layer of oil containing the desired flavor. Flavoring can also be added during extraction by including the flavoring in the solvent used to extract the oil from the animal-derived fried food product. It as been found by the inventor hereof that when flavoring is added to the solvent at least some of the flavoring remains on the food product after extraction. The flavoring can also be added after extraction by passing additional flavor-containing solvent over the food product before removal from the extraction zone.

What is claimed is:

1. A process for removing a fat substitute from a food product selected from agricultural and animal-derived food products which are fried in said fat substitute, which process comprises:

(a) introducing a fried food product into an extraction zone;

(b) removing air from the extraction zone;

(c) introducing a normally gaseous solvent into said extraction zone under conditions wherein the normally gaseous solvent will liquefy, which normally gaseous solvent is selected from the group consisting of methane, ethane, propane, butane, isobutane, ethylene, propylene, butylene, sulfur dioxide, nitrogen, carbon dioxide, ammonia, dichlorodifluor methane, dimethylether, $CHF_3$, $CClF_3$, $CFBr_3$, $CF_2=CH_2$, $CF_3-CF_2-CF_3$ $CF_4$, $CH_3-CF_3$, $CHCl_2$, methyl fluoride, nitrogen oxides, an (d) maintaining said solvent in contact with said fried food product at effective temperatures and pressures and for an effective amount of time to remove a predetermined amount of fat substitute;

(e) collecting the resulting fat substitute-laden solvent; and (f) collecting the fried food product having substantially less fat substitute.

2. The process of claim 1 wherein the fat substitute is selected from the group consisting of polyol fatty acid polyesters, esters of tricarballylic acids, diesters of dicarboxylic acids, triglycerides of alpha-branched chain carboxylic acids, ethers and ether esters containing a neopentyl group, fatty polyesters of polyglycerol, alkyl glycoside fatty acid polyesters, polyesters of two ether linked hydroxypolycarboxylic acids, esters of epoxide-extended polyols, polydimethyl siloxanes, carboxy and carboxylated disubstituted esters, trishydroxymethyl alkane esters, crosslinked protein fat substitute compositions, esterified polyoxyalkylene block copolymers, synthetic polyalpha olefin cooking and frying oils, and substituted succinate acid esters.

3. The process of claim 2 wherein the fat substitute is comprised of a polyol fatty acid polyester.

4. The process of claim 3 the solvent is selected from the group consisting of methane, ethane, propane, butane, isobutane, hexane, and mixtures thereof.

5. The process of claim 4 wherein the solvent is propane.

6. The process of claim 1 wherein the agricultural food product is a fried snack food based on a food selected from the group consisting of potatoes and corn.

7. The process of claim 6 wherein the agricultural food product is a fried snack food selected from potato chips and corn chips.

8. The process of claim 3 wherein the agricultural food product is a fried snack food selected from potato chips and corn chips.

9. The process of claim 1 wherein the temperature during extraction is from about 60° to 140° F.

10. The process of claim 9 wherein the pressure in the extraction zone during extraction is fluctuated from about 0.25 psig to 50 psig.

11. The process of claim 8 wherein the temperature during extraction is from about 60° to 140° F. and the pressure is fluctuated from about 0.25 psig to 50 psig.

12. The process of claim 8 wherein the extracted food product is subjected to hot inert gas or microwaves to remove residual amounts of solvent.

* * * * *